United States Patent
Domoy et al.

(10) Patent No.: US 9,273,199 B2
(45) Date of Patent: Mar. 1, 2016

(54) HIGH DENSITY POLYETHYLENE COMPOSITION AND CLOSURE

(71) Applicants: Brett Christopher Domoy, Brookfield, CT (US); Barrett Albert Unger, Glenview, IL (US); Mark T. Jablonka, Pearland, TX (US)

(72) Inventors: Brett Christopher Domoy, Brookfield, CT (US); Barrett Albert Unger, Glenview, IL (US); Mark T. Jablonka, Pearland, TX (US)

(73) Assignees: Dow Global Technologies LLC, Midland, MI (US); Conopco, Inc., Englewood Cliffs, NJ (US)

(*) Notice: Subject to any disclaimer, the term of this patent is extended or adjusted under 35 U.S.C. 154(b) by 122 days.

(21) Appl. No.: 13/914,460

(22) Filed: Jun. 10, 2013

(65) Prior Publication Data
US 2013/0331496 A1    Dec. 12, 2013

Related U.S. Application Data

(60) Provisional application No. 61/658,184, filed on Jun. 11, 2012.

(51) Int. Cl.
 *C08L 23/06* (2006.01)
 *C08L 23/04* (2006.01)
 *C08F 110/02* (2006.01)
(52) U.S. Cl.
 CPC ............. *C08L 23/06* (2013.01); *C08F 110/02* (2013.01); *C08L 23/04* (2013.01); *C08L 2205/02* (2013.01); *C08L 2205/025* (2013.01); *Y10T 403/45* (2015.01)
(58) Field of Classification Search
 CPC ....................................................... C08L 23/06
 USPC ................................................................ 524/321
 See application file for complete search history.

(56) References Cited

U.S. PATENT DOCUMENTS

| 5,271,536 A | 12/1993 | Wilson |
| 5,695,084 A | 12/1997 | Chmela |
| 5,992,659 A | 11/1999 | Nofer |
| 6,766,926 B1 | 7/2004 | Elchert |

(Continued)

FOREIGN PATENT DOCUMENTS

| EP | 2017302 | 1/2009 |
| JP | 2006299062 | 11/2006 |

(Continued)

OTHER PUBLICATIONS

English Translation of JP 2006-299062 Obtained Jan. 26, 2015 at http://www19.ipdl.inpit.go.jp/PA1/cgi-bin/PA1DETAIL.*

(Continued)

*Primary Examiner* — Ling Choi
*Assistant Examiner* — Lanee Reuther
(74) *Attorney, Agent, or Firm* — Wiggin and Dana LLP; Gregory S. Rosenblatt

(57) ABSTRACT

Disclosed is a high-density polyethylene (HDPE) composition that comprises at least a first high density polyethylene component having a density of 0.940-0.968 g/cm$^3$ and a melt index $I_{2.16}$ of 0.5-10.0 dg/min and a melt flow ratio (flow index $I_{21.6}$ at 190° C. divided by melt index $I_{2.16}$ at 190° C.) of at least 25. A second HDPE component may be included in the composition with melt index $I_{2.16}$ of greater than 10 dg/min and melt flow ratio of 30 or less. The disclosed compositions are suitable for use in living hinge closure applications.

18 Claims, 13 Drawing Sheets

(56) References Cited

U.S. PATENT DOCUMENTS

| | | |
|---|---|---|
| 2003/0114594 A1 | 6/2003 | Starita |
| 2005/0261435 A1* | 11/2005 | Starita .......................... 525/240 |
| 2006/0275571 A1 | 12/2006 | Mure et al. |
| 2008/0011709 A1 | 1/2008 | Ibayashi et al. |
| 2008/0221273 A1* | 9/2008 | Michie, Jr. et al. ........... 525/240 |
| 2009/0029182 A1* | 1/2009 | Aubee et al. ............... 428/476.9 |
| 2011/0115135 A1 | 5/2011 | Siegl |
| 2011/0136983 A1 | 6/2011 | Kapur |
| 2011/0201729 A1* | 8/2011 | Haley et al. ..................... 524/88 |
| 2012/0074027 A1 | 3/2012 | Nagpal |
| 2015/0045485 A1 | 2/2015 | Tsutimoto et al. |

FOREIGN PATENT DOCUMENTS

| | | | |
|---|---|---|---|
| JP | 2006299062 A | * | 11/2006 |
| JP | 2007224132 | | 9/2007 |
| WO | 2008/136849 A1 | | 11/2008 |
| WO | 2011004032 | | 1/2011 |
| WO | 2013/045663 A1 | | 4/2013 |
| WO | 2013096308 | | 6/2013 |
| WO | 2013/118749 A1 | | 8/2013 |

OTHER PUBLICATIONS

International Preliminary Report on Patentability for International Patent Application No. PCT/US2013/045005, dated Dec. 16, 2014.
International Preliminary Report on Patentability for International Patent Application No. PCT/US2013/044999, dated Dec. 16, 2014.
International Search Report for International Patent Application No. PCT/US2013/045005, dated Jul. 12, 2013.
International Search Report for International Patent Application No. PCT/US2013/044999, dated Jul. 12, 2013.
EP 13 729 908.7, Communication pursuant to Article 94(3) EPC, Sep. 28, 2015.

* cited by examiner

LIVING HINGE DESIGN
FOR POLYPROTYLENE AN POLYETHYLENE

HIGH DENSITY POLYETHYLENE COMPOSITION AND CLOSURE

CROSS REFERENCE TO RELATED APPLICATIONS

The present invention claims priority under 35 U.S.C. §119 (e) of U.S. Provisional Patent Application No. 61/658,184, filed Jun. 11, 2012, entitled "High Density Polyethylene Composition and Closure" the contents of which are incorporated herein by reference in their entirety.

FIELD OF THE DISCLOSURE

The subject matter of the present disclosure generally relates to closures formed from polyethylene compositions and more particularly relates to high density polyethylene compositions and closures that deliver high levels of living-hinge durability.

BACKGROUND OF THE DISCLOSURE

Polypropylene (PP) has traditionally dominated the living-hinge dispensing closure market as it is easily processed and has good hinge durability characteristics. Additionally, it is widely available and historically had favorable economics relative to polyethylene when utilized to these ends. These attributes coupled with PP's overall balance of properties make it a frequent choice for living-hinge closure applications, as well as many molding applications.

However, the historically favorable economics of PP have been challenged in recent years by increasing costs attributable to industry and market dynamics. Increased price volatility and high costs have led to a reduction of PP capacity in North America, further challenging supply availability and putting increased commodity cost pressures on users of the material. High-Density Polyethylene (HDPE) offers favorable drop impact and cold temperature toughness to PP. These characteristics could enable further design flexibility and increased performance attributes of molded packaging, especially in the area of living-hinge dispensing closures. However, hinge durability when using known HDPE compositions has been less than acceptable relative to PP. In addition, a switch from PP to HDPE often introduces dimensional differences which can require expensive capital expenditures and tooling investment. The subject matter of the present disclosure is directed to overcoming, or at least reducing the effects of, one or more of the problems set forth above.

BRIEF SUMMARY OF THE DISCLOSURE

Disclosed is a high density polyethylene (HDPE) composition that can economically be used in conventional injection molding processes and that yields hinge durability in excess of that of conventional HDPE materials used in comparable applications. The disclosed HDPE compositions can be utilized to form dispensing closures with living-hinge functionality that have comparable processing and application performance to PP-based dispensing closures, thereby overcoming many of the historical deficiencies of HDPE as a replacement for PP in such applications, and more generally in the area of molded articles. In many instances, the disclosed HDPE compositions can serve as a direct replacement for polypropylene.

DETAILED DESCRIPTION OF THE DISCLOSURE

Figure 1:
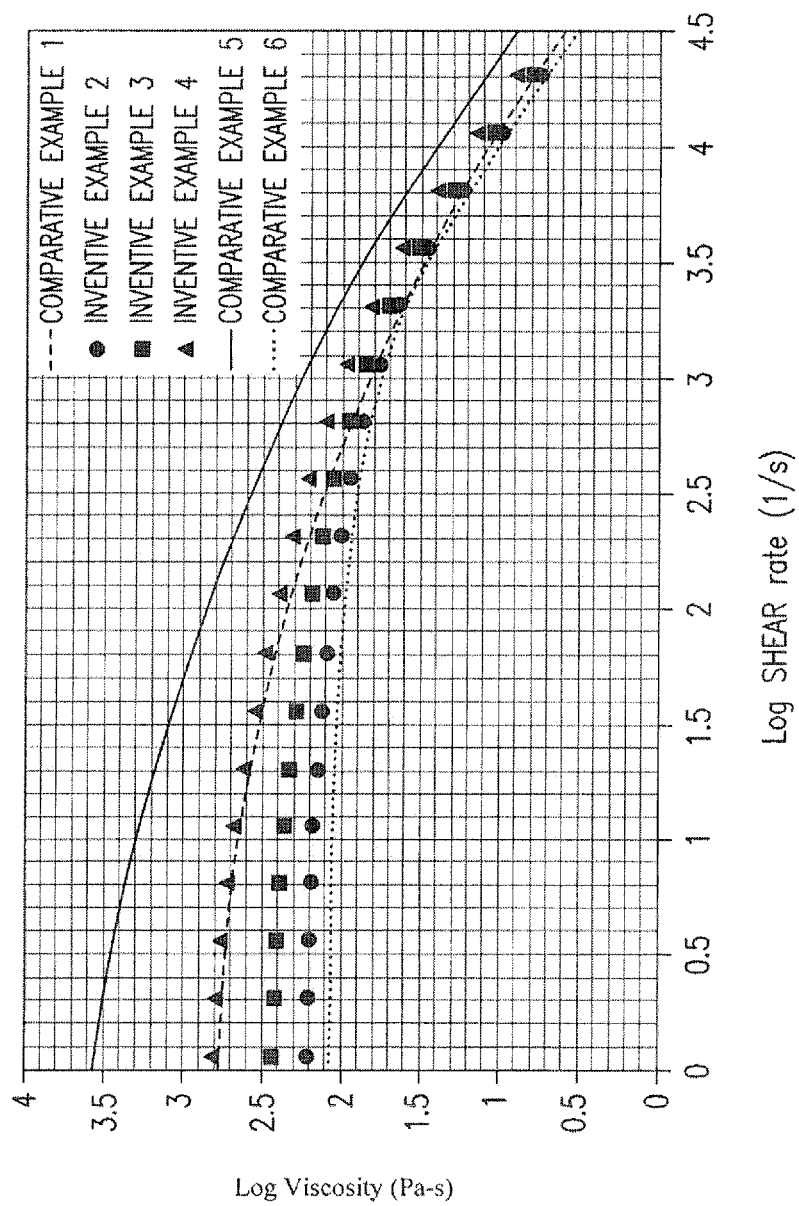
FIG. 1 is a graph of viscosity as a function of shear rate for several comparative and demonstrated embodiments.

Disclosed is a HDPE composition capable of being fabricated into a molded article having a living-hinge feature and demonstrating good durability. The disclosed HDPE composition includes at least a first high density polyethylene (HDPE) resin having a density of 0.940-0.968 g/cm$^3$ and a melt index $I_{2.16}$ of 0.5-10.0 dg/min and a melt flow ratio (flow index $I_{21.6}$ at 190° C. divided by melt index $I_{2.16}$ at 190° C.) of at least 25, more preferably at least 50, still more preferably at least 55.

In a preferred embodiment, the composition includes a second resin having an HDPE with melt index $I_{2.16}$ of greater than 10 dg/min and melt flow ratio of 30 or less, alternatively 25 or less. In some embodiments it is preferred that the first HDPE resin have an $M_z$ (as determined by GPC) of greater than 200,000, preferably greater than 220,000. $M_z$ is described in Structure and Rheology of Molten Polymers—from Structure to Flow Behavior and Back Again, by John M. Dealy. The first HDPE component preferably is between 10 to 90 percent by weight of the molded article, more preferably from 10 to 50 percent, while the second HDPE resin preferably is from 90 to 10 percent, more preferably from 50 to 90 percent.

A hinged component formed from the disclosed compositions may include a filler, such as in amounts of approximately 0.1-80%. Suitable fillers for this purpose may include without limitation glass spheres, calcium carbonate, post consumer recycle, glass fibers, talc, or any other organic or inorganic filler or combination thereof.

A hinged component formed from the disclosed compositions may include additional additives in amounts generally between 1-10,000 ppm of the one or more additional additives. Such additives may include without limitation polymer processing aids (ppa), slip components, nucleators, antistatic additives, and organic or inorganic performance enhancing additives or combinations thereof. Particularly effective nucleators include metal salts of hexahydrophthalic acid (HHPA).

The disclosed HDPE composition may further comprise additional polyethylene components. Certain embodiments of the disclosed HDPE composition may be produced in many commercially available continuous reaction processes, particularly those comprising two or more individual reactors in series or parallel using slurry, solution or gas phase process technology or hybrid reaction systems (e.g. combination of slurry and gas phase reactor). Alternatively, the disclosed preferred compositions may also be produced by offline blending 2 or more different polyethylene resins. In a particular embodiment, a conventional mono-modal Ziegler-Natta HDPE was blended with a multi-modal Ziegler-Natta HDPE, however, it is expected that the various polyethylene components of the disclosed multimodal compositions can be produced with alternative catalyst systems, such as metallocene, post metallocene or chromium based catalysts.

The disclosed HDPE compositions exhibit processing characteristics similar to that of the incumbent polypropylene resins and the living-hinge on the closure demonstrated acceptable hinge durability. Single components of the HDPE composition used alone have been found to exhibit a less commercially acceptable combination of processing and hinge durability characteristics. For example, if only a uni-modal or even a multi-modal Ziegler-Natta HDPE meeting the characteristics of the first HDPE component was used, processing characteristics would be undesirable, and if only a high flow conventional mono-modal Ziegler-Natta HDPE meeting the characteristics of the second HDPE component was used, hinge durability would be unacceptably poor. Accordingly, compositions having both the first HDPE component and the second HDPE component are generally preferred.

Table 1 provides the resins that were used to demonstrate several embodiments of the disclosed composition as utilized in hinge components. The polypropylene used is a conventional resin used in the application today.

Density measurements were made in accordance with ASTM D792. Melt flow ratio (MFR) is defined as the ratio of flow index $I_{21.6}$ at 190° C. divided by melt index $I_{2.16}$ at 190° C. Melt Index measurements made in accordance with ASTM D1238 (2.16 kg/190° C.).

TABLE 1

| Resin Name | Type | Flow Index (dg/min) | Density (g/cm3) | Melt Flow Ratio |
|---|---|---|---|---|
| RESIN A | First HDPE | 1.5 (2.16 kg 190 C.) | 0.955 | 65 |
| RESIN B | Second HDPE | 44 (2.16 kg 190 C.) | 0.951 | 25 |
| RESIN C | RCP | 10 (2.16 kg 230 C.) | 0.900 | Not Measured |
| RESIN D | LLDPE | 105 (2.16 kg 190° C.) | 0.929 | 25 |
| RESIN E | LLDPE | 20 (2.16 kg 190° C.) | 0.924 | 25 |
| RESIN F | LLDPE | 50 (2.16 kg 190° C.) | 0.926 | 25 |
| RESIN G | Second HDPE | 20 (2.16 kg 190° C.) | 0.954 | 25 |
| RESIN H | Second HDPE | 40 (2.16 kg 190° C.) | 0.953 | 19 |
| RESIN I | First HDPE | 2.0 (2.16 kg 190° C.) | 0.954 | 31 |
| RESIN J | Second HDPE | 66 (2.16 kg 190° C.) | 0.952 | 25 |

FIG. 1 is a graph of sample rheology data at 220° C. Comparative Example 1 is 100% RESIN C (the RCP or Random Co-Polymer Polypropylene). Comparative Example 5 is 100% RESIN A. Comparative Example 6 is 100% RESIN B. Inventive Example 2 contains 90% RESIN B and 10% RESIN A. Inventive Example 3 contains 75% RESIN B and 25% RESIN A.

FIG. 1 is a graph of a trend line illustrating the increased viscosity of Comparative Example 5 at higher shear rates, and the lower viscosity of Comparative Example 6 relative to Comparative Example 1 at low shear rates but approaching Comparative Example 1 at high shear rates. Points are added to the graph to show the rheology of the inventive materials. Both Inventive Example 2 and 3 have rheology in the high shear region very similar to the Comparative Example 1, which is 100% RCP. Inventive Example 4 has a higher viscosity in the high shear region than Comparative Example 1, however is much lower than Comparative Example 5 and therefore is more easily processed.

Table 2 summarizes maximum injection pressures as materials are injection molded into hinged closures, demonstrating that as the composition of RESIN A in the inventive samples is increased the maximum injection pressure is reduced enabling an improvement in processing characteristics.

TABLE 2

| Sample | RESIN A (wt %) | RESIN B (wt %) | Maximum Injection Pressure (Bar) | Change (%) |
|---|---|---|---|---|
| INVENTIVE EXAMPLE 5 | 100 | 0 | 1,111 | 0 |
| INVENTIVE EXAMPLE 4 | 50 | 50 | 962 | −13 |
| INVENTIVE EXAMPLE 3 | 25 | 75 | 768 | −31 |
| COMPARATIVE EXAMPLE 6 | 0 | 100 | 646 | −42 |

Table 3 summarizes the hinge durability performance of comparative and inventive samples. In order to measure hinge durability, an automatic hinge durability test instrument was used in which the bottom, or flange, of the closure was affixed to a stationary platen on the instrument and the top of the closure was fastened to a moving fixture. The moving fixture opened and closed the closure from 10° of the fully closed position to the normal open position at a rate of 1 cycle per second. The cycle at which a failure indicated by a complete breakage of the hinge or strap was observed and recorded. All hinge durability testing was completed at standard atmospheric temperature and pressure.

TABLE 3

| Sample | RESIN A (wt %) | RESIN B (wt %) | RESIN C (wt %) | Number of cycles (Count) |
|---|---|---|---|---|
| COMPARATIVE EXAMPLE 1 | 0 | 0 | 100 | >200 |
| INVENTIVE EXAMPLE 5 | 100 | 0 | 0 | >200 |
| INVENTIVE EXAMPLE 4 | 50 | 50 | 0 | >200 |
| INVENTIVE EXAMPLE 3 | 25 | 75 | 0 | >200 |
| COMPARATIVE EXAMPLE 6 | 0 | 100 | 0 | 130 |

As expected, Comparative Example 1 produced from 100% RCP, meets hinge durability requirements and is commercially used in that manufacture today. Comparative Example 5 is 100% RESIN A, a multimodal HDPE with an MFR>50, meeting hinge durability requirements, but as shown above in FIG. 1, processing characteristics for Inventive Example 5 are not desirable for the current injection molding process as viscosity across a range of shear rates is greater than the RCP currently used (RESIN C). Inventive Examples 3 and 4 unexpectedly possess good hinge durability, and as shown in FIG. 1, comparable processing characteristics to RCP.

Table 4 displays the results of a second evaluation of inventive compositions. Comparative Example 1 (100% polypropylene) and Inventive Examples 2, 3, and 6 (100% polyethylene based) demonstrate good hinge durability and good processing characteristics. These results indicate that the addition of a multi-modal HDPE to a mono-modal HDPE in concentrations less than 25% but greater than 10% renders good processing characteristics for commercial production and good hinge durability performance for commercial use of the closure.

TABLE 4

| Sample | RESIN A (wt %) | RESIN B (wt %) | RESIN C (wt %) | Number of cycles (Count) | Maximum Injection Pressure (psi) |
|---|---|---|---|---|---|
| COMPARATIVE EXAMPLE 1 | 0 | 0 | 100 | >1000 | 1,894 |
| INVENTIVE EXAMPLE 3 | 25% | 75% | 0 | 725 | 2,009 |
| INVENTIVE EXAMPLE 11 | 15% | 85% | 0 | 379 | 1,890 |
| INVENTIVE EXAMPLE 2 | 10% | 90% | 0 | 250 | 1,840 |

Additional evaluations are summarized in Table 5. All examples were fabricated into hinged closures as illustrated in FIGS. 3, 4, 5, and 11, and tested for hinge durability. None of the Comparative Examples met the preferred minimum requirement for hinge durability of 200 cycles.

TABLE 5

| Sample | Material Name | Type | Number of cycles (Count) |
|---|---|---|---|
| COMPARATIVE EXAMPLE 7 | 100% RESIN D | 105MI, 0.929 g/cm3 LLDPE | <200 |
| COMPARATIVE EXAMPLE 8 | 100% RESIN E | 20MI, 0.924 g/cm3 LLDPE | <200 |
| COMPARATIVE EXAMPLE 9 | 100% RESIN F | 50MI, 0.926 g/cm3 LLDPE | <200 |
| COMPARATIVE EXAMPLE 10 | 100% RESIN G | 20MI, 0.954 g/cm3 HDPE | <200 |
| COMPARATIVE EXAMPLE 6 | 100% RESIN B | 44MI, 0.951 g/cm3 HDPE | <200 |
| COMPARATIVE EXAMPLE 12 | 50% RESIN H, 50% RESIN G | 50%: 40MI, 0.953 g/cm3 HDPE 50%: 20MI, 0.954 g/cm3 HDPE | <200 |
| COMPARATIVE EXAMPLE 13 | 50% RESIN H, 50% RESIN B | 50%: 40MI, 0.953 g/cm3 HDPE 50%: 44MI, 0.951 g/cm3 HDPE | <200 |
| COMPARATIVE EXAMPLE 14 | 100% RESIN H | 40MI, 0.953 g/cm3 HDPE | <200 |

The effect of colorants, which may enhance the appearance of the closure, on Inventive Example 3 is displayed in Table 6. Inventive Example 3 was augmented with 2 wt % of different colorants, and then referred to as Inventive Example 15. The resulting hinges were tested using the hinge durability tester. Each hinge was tested until failure or until 1,000 cycles had been reached, whichever came first. These tests demonstrate that blending colorants with Inventive Example 3 resulted in comparable or better hinge durability.

TABLE 6

| Sample | Resin Composition | Colorant | Number of cycles (Count) |
|---|---|---|---|
| INVENTIVE EXAMPLE 3 | 25% RESIN A, 75% RESIN B | None | 799 |
| INVENTIVE EXAMPLE 15 | 25% RESIN A, 75% RESIN B | Bronze (1) | 902 |
| | | Green (2) | 983 |
| | | Navy Blue (3) | 835 |
| | | Royal Blue (4) | 898 |
| | | Trans Blue(5) | 742 |
| | | Yellow (6) | 901 |

Note:
Colorants Bronze (1), Green (2), Navy Blue (3), Royal Blue (4), and Yellow (6), were obtained from Clariant International Ltd, Rothausstrasse 6, CH-4132 Muttenz, Switzerland as masterbatches.
Trans Blue (5) was obtained from ColorMatrix, 680 North Rocky River Drive, Berea, Ohio 44017-1628, in liquid form.
The colorants are known and customarily used to add color to plastic components.

Additional evaluations were performed to determine the impact of varying resin properties on hinge durability. The results are displayed in Table 7. The hinges of these closures are tested using the hinge durability tester. Each hinge was tested until failure or until 1,000 cycles had been reached, whichever came first.

In a first series of experiments, Inventive Examples 16 and 17, it is demonstrated that replacing RESIN A (MFR 65), with RESIN I (a conventional HDPE product with a melt index of 2.0 dg/min at 190° C., an MFR of 31 and density of 0.954 g/cm$^3$) in Inventive Example 3 significantly improves hinge durability. The number of hinge cycles for Inventive Examples 16 and 17 were above the 130 hinge cycles demonstrated in Comparative Example 6 (100% RESIN B), see Table 4 above, thus demonstrating that formulations having melt flow ratios of 25 or greater show improvement in hinge performance.

In a second series of Experiments, Inventive Examples 18-20, RESIN B (melt index 44) in the Inventive Example 3 composition is replaced with RESIN J (a conventional HDPE product with a melt index of 66 dg/min at 190° C. and density of 0.952 g/cm3). These results demonstrate that significant improvement in hinge durability can be achieved even when using a resin with a higher melt index.

TABLE 7

| Sample | Resin Composition | Number of cycles (Count) |
|---|---|---|
| INVENTIVE EXAMPLE 16 | 10% RESIN I, 90% RESIN B | 461 |
| INVENTIVE EXAMPLE 17 | 25% RESIN I, 75% RESIN B | 600 |
| INVENTIVE EXAMPLE 18 | 10% RESIN A, 90% RESIN J | 295 |
| INVENTIVE EXAMPLE 19 | 15% RESIN A, 90% RESIN J | 550 |
| INVENTIVE EXAMPLE 20 | 25% RESIN A, 90% RESIN J | 872 |

The effect of adding the commercial nucleator HHPA derivative consisting of 330 ppm of 1,2-Cyclohexanedicarboxylic Acid, Calcium Salt (CAS#491589-22-1) and 170 ppm Zinc Stearate was determined (Table 8). The nucleator was blended with the composition of Inventive Example 3 to produce Inventive Example 21, and hinge closures were produced in the injection molding process. The hinges of these closures were tested using the hinge durability tester. Each hinge was tested until failure or until 1,000 cycles had been reached, whichever came first. Inventive Example 21 exhibited greater hinge durability, demonstrating that HHPA nucleation of HDPE improves hinge durability.

TABLE 8

| Sample | Number of cycles (Count) | Standard Deviation | Replicates |
|---|---|---|---|
| INVENTIVE EXAMPLE 3 | 904 | 81 | 20 |
| INVENTIVE EXAMPLE 21 | 961 | 57 | 20 |

To further understand the molecular architecture that yields the improvement in hinge durability, Gel Permeation Chromotography (GPC) was used. Table 9 contains a summary of GPC results with corresponding hinge durability performance.

Molecular Weight (MW) and Molecular Weight Distribution (MWD) Determination by HT GPC A PolymerChar (Valencia, Spain) high temperature Gel Permeation Chromatography system consisting of an Infrared concentration/composition detector (IR-5), a PDI 2040 laser light scattering (Precision Detector, now Agilent) and a four capillary bridge viscometer (Viscotek, now Malvern) was used for MW and MWD determination. The carrier solvent was 1,2,4-trichlorobenzene (TCB). The solvent delivery pump, the on-line solvent degasser, auto-sampler, and column oven were from Agilent. The auto-sampler and detector compartments were operated at 160° C., and the column compartment was operated at 150° C. The columns were four PLgel Olexis, 13 micron columns (Agilent). The chromatographic solvent and the sample preparation solvent contained 250 ppm of butylated hydroxytoluene (BHT) and both solvent sources were nitrogen sparged. Polyethylene samples were semi-automatically prepared at targeted concentrations of 2 mg/mL by weighing samples via a computer controlled balance, and delivering calculated amount of solvent via the auto-sampler. Samples were dissolved at 160° C. for 3 hour with gentle agitation. The injection volume was 200 and the flow rate was 1.0 mL/minute.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights. The polystyrene standard peak molecular weights were converted to polyethylene molecular weights using the following equation (as described in Williams and Ward, J. Polym. Sci., Polym. Let., 6, 621 (1968)):

$$M_{PE} = A(M_{PS})^B \quad (1)$$

Here B has a value of 1.0, and the experimentally determined value of A is around 0.38. A fifth order polynomial was used to fit the respective polyethylene-equivalent calibration points obtained from equation (1) to their observed elution volumes for each polystyrene standard. Number average, weight average, and zeta average molecular weights were calculated according to the following equations:

$$Mn = \frac{\sum_i Wf_i}{\sum_i (Wf_i / M_i)} \quad (2)$$

$$Mw = \frac{\sum_i (Wf_i * M_i)}{\sum_i Wf_i} \quad (3)$$

$$Mz = \frac{\sum_i (Wf_i * M_i^2)}{\sum_i (Wf_i * M_i)} \quad (4)$$

Where, $Wf_i$ is the weight fraction of the i-th component and $M_i$ is the molecular weight of the i-th component.

The MWD was expressed as the ratio of the weight average molecular weight (Mw) to the number average molecular weight (Mn).

The accurate A value was determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 115,000 g/mol.

In the case of Inventive Example 5, hinge durability testing was adequate at greater than 200 cycles, but this composition does not exhibit processing conditions which are as favorable as Inventive Examples comprising both the first and the second HDPE components. Notably, Comparative Example 6 has unacceptable hinge durability. A comparison of all the Inventive Examples with Comparative Example 6 shows that an increase in Mz and Mz/Mw is desirable for good hinge performance. Thus, it is desirable to have a Mz of 200,000 or greater for good hinge durability, preferably 250,000 or greater The resins used in the present examples all have a Mw of 40,000 g/mol or greater. It is desirable to have a Mw of less than 70,000 g/mol, and more preferably less than 65,000 for favorable processing/molding characteristics.

TABLE 9

| | Description | Mn (g/mol) | Mw (g/mol) | Mz (g/mol) | Mz/Mw | Mw/Mn | Melt Index (dg/min) | MFR | Number of Cycles (Count) |
|---|---|---|---|---|---|---|---|---|---|
| INVENTIVE EXAMPLE 5 | 100% RESIN A | 8,357 | 112,096 | 560,006 | 5.0 | 13.4 | 1.4 | 69 | >200 |
| COMPARATIVE EXAMPLE 6 | 100% RESIN B | 9,272 | 44,236 | 160,331 | 3.6 | 4.8 | 44.0 | 25 | 130 |
| INVENTIVE EXAMPLE 3 | 25% RESIN A 75% RESIN B | 8,746 | 61,373 | 343,379 | 5.6 | 7.0 | 16.7 | 34 | 799 |
| INVENTIVE EXAMPLE 20 | 25% RESIN A 75% RESIN J | 8,192 | 57,594 | 332,456 | 5.8 | 7.0 | 21.7 | 35 | 872 |
| INVENTIVE EXAMPLE 17 | 25% RESIN I 75% RESIN B | 10,273 | 59,317 | 273,803 | 4.6 | 6.1 | 16.3 | 29 | 600 |

TABLE 9-continued

| | Description | Mn (g/mol) | Mw (g/mol) | Mz (g/mol) | Mz/Mw | Mw/Mn | Melt Index (dg/min) | MFR | Number of Cycles (Count) |
|---|---|---|---|---|---|---|---|---|---|
| INVENTIVE EXAMPLE 19 | 15% RESIN A 85% RESIN J | 8,516 | 52,248 | 286,834 | 5.5 | 6.1 | 33.0 | 29 | 550 |
| INVENTIVE EXAMPLE 16 | 10% RESIN I 90% RESIN B | 9,746 | 49,607 | 204,598 | 4.1 | 5.1 | 27.8 | 25 | 461 |
| INVENTIVE EXAMPLE 18 | 10% RESIN A 90% RESIN J | 8,466 | 45,008 | 212,951 | 4.7 | 5.3 | 39.5 | 29 | 414 |

Figure 2:
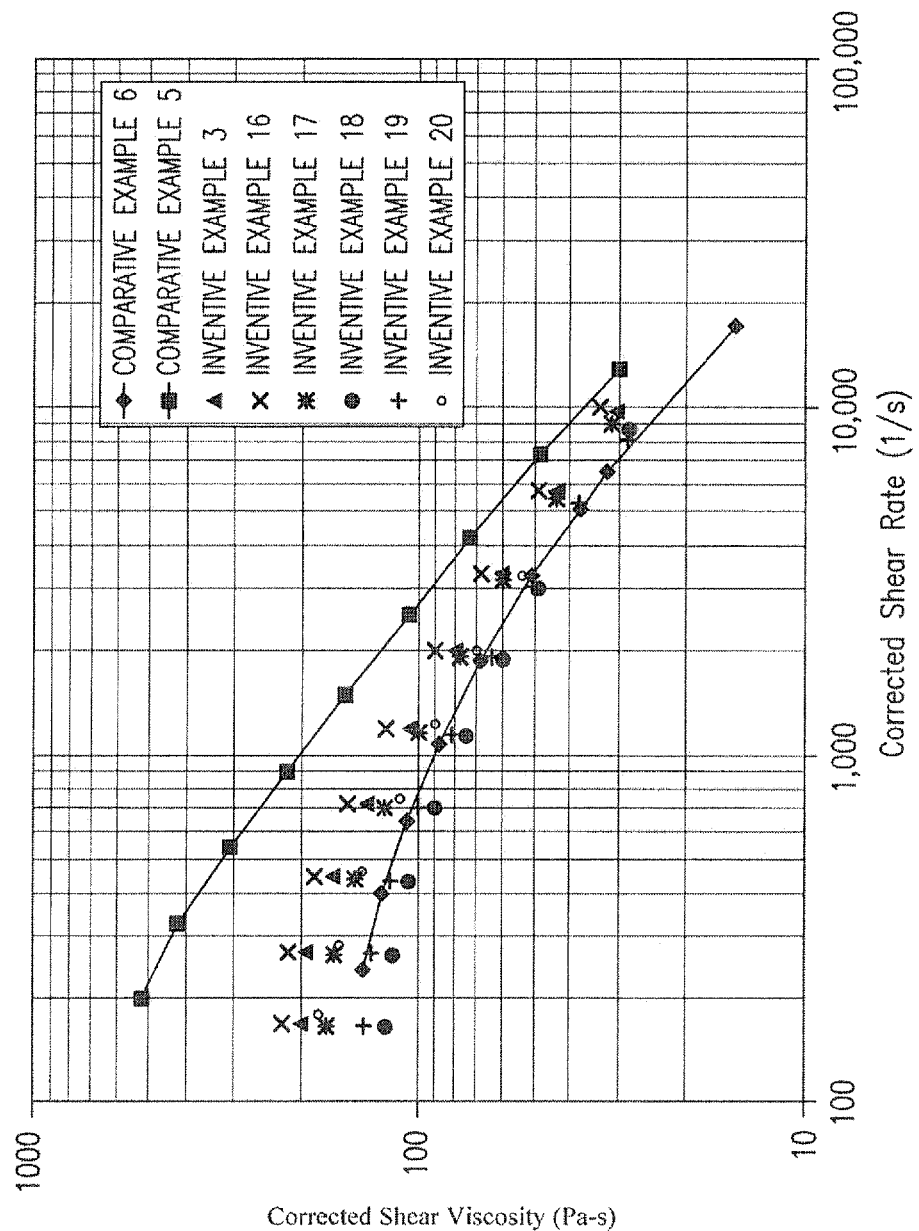
FIG. 2 is a graph of corrected shear viscosity as a function of corrected shear rate for several comparative and demonstrated embodiments.

Capillary rheology of a set of the Inventive Examples is shown in FIG. 2, measured at 190° C. At a shear rate of 200/s a viscosity between 150 to 250 Pa-s is desirable to obtain desired processing characteristics for the injection molded living-hinge part. At a shear rate of 8,000/s, a viscosity of 25-40 Pa-s is desirable to obtain desired processing characteristics for the injection molded living-hinge part.

Capillary viscosity was measured at 190° C. on a Rosand RH 2000 fitted with a flat entrance (180 degrees) die of length 16 mm and diameter of 1 mm at apparent shear rates ranging from 160 to 6300 s−1. Rabinowitsch correction is applied to account for the shear thinning effect.

FIG. 2 is a graph of result values of corrected viscosity as a function of corrected shear rate for the above described comparative and inventive examples.

Hinged Components

A hinged component is defined to consist of multiple bodies connected by a continuous, partial, or segmented thinner section that acts as a fulcrum allowing one or more bodies to bend from molded position. In line with Wiley Encyclopedia of Packaging Technology (2$^{nd}$ Edition) the hinged-top component that is used as a closure consists of a dispensing orifice incorporated in a screw-on, snap-on, or integrated into the base of the component and may be implemented in a variety of ways.

Useful hinge component designs include but are not limited to ingle strap, dual strap, multi strap, and butterfly designs, such as those illustrated in FIGS. 1-8.

Figure 3:
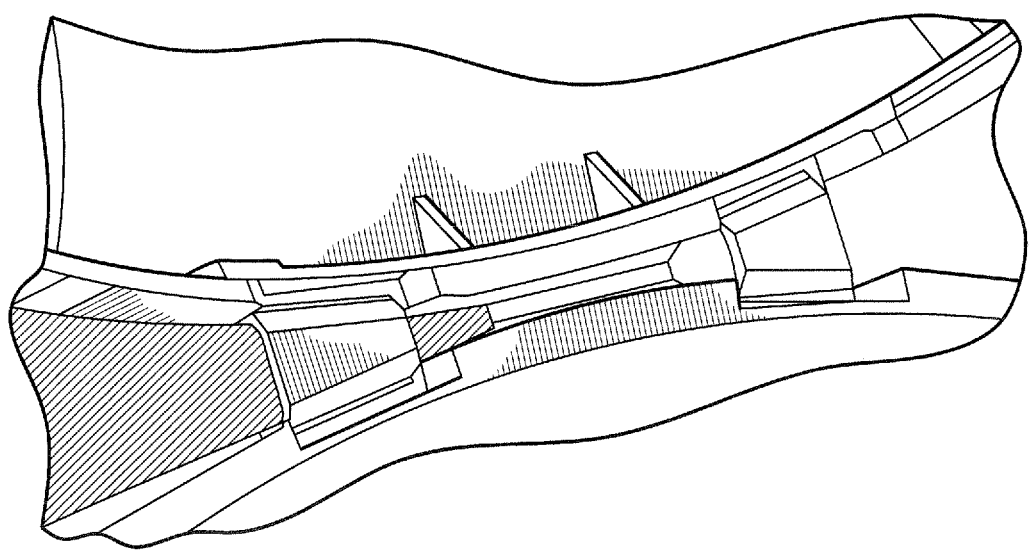
FIG. 3 is a detailed perspective view taken from the top of the biased dual strap hinged closure embodiment illustrated in FIGS. 4 and 5.
Figure 4:
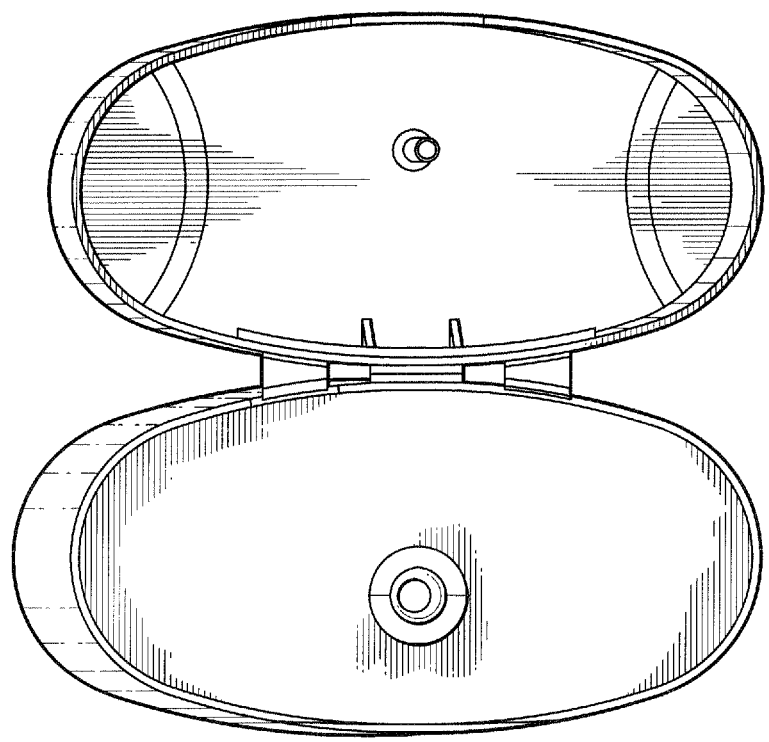
FIG. 4 is a perspective view taken from the top of a biased dual strap hinge closure embodiment shown in an open position.
Figure 5:
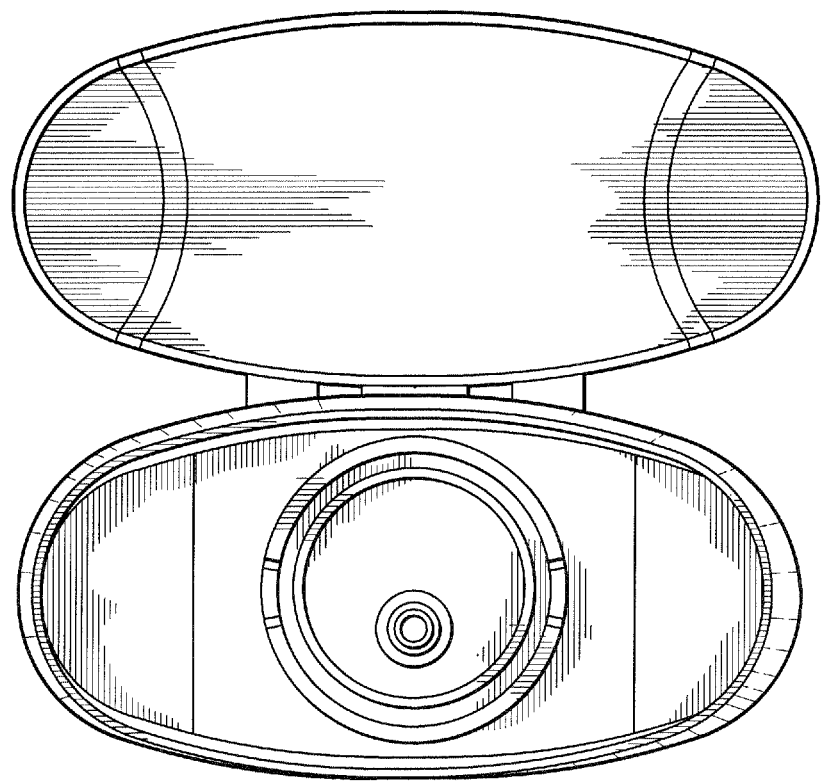
FIG. 5 is a perspective view taken from the bottom of the biased dual strap hinge closure embodiment of FIG. 4 shown in an open position.

FIGS. 3, 4, and 5, are detailed perspective views of biased dual strap hinged closures.

Figure 6:
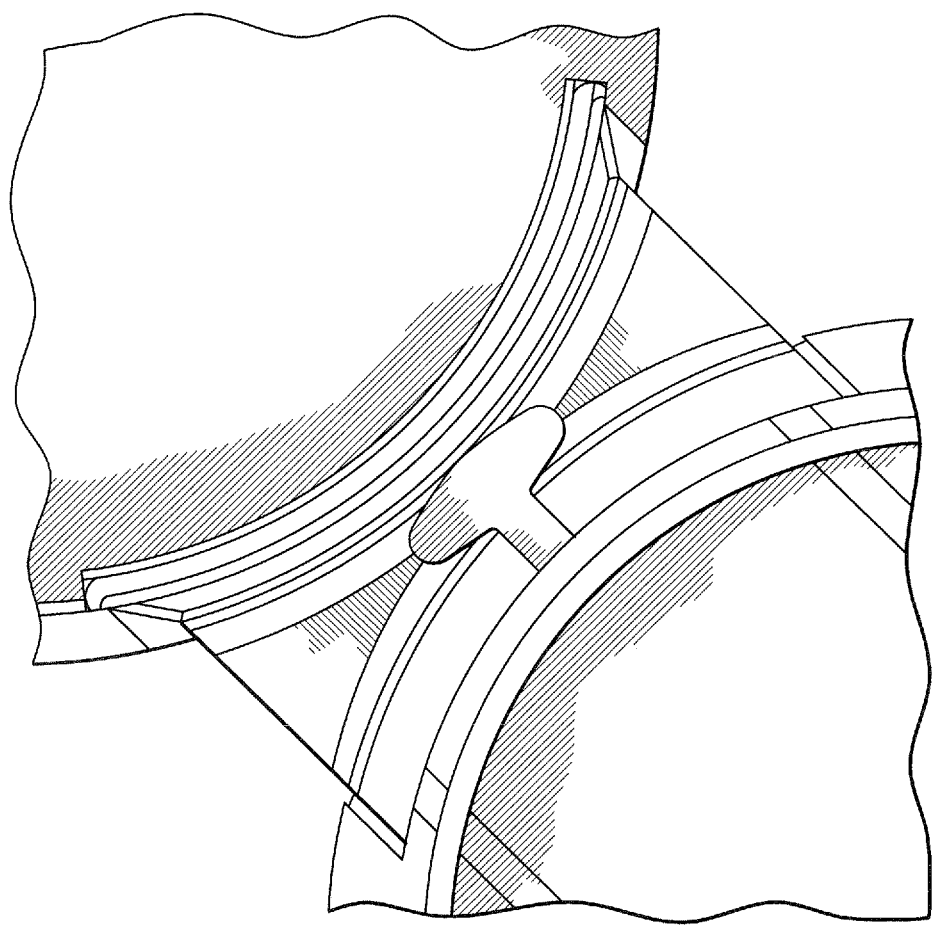
FIG. 6 is a top plan detailed view of an embodiment of a butterfly hinge design of a closure shown in the open position.
Figure 7:
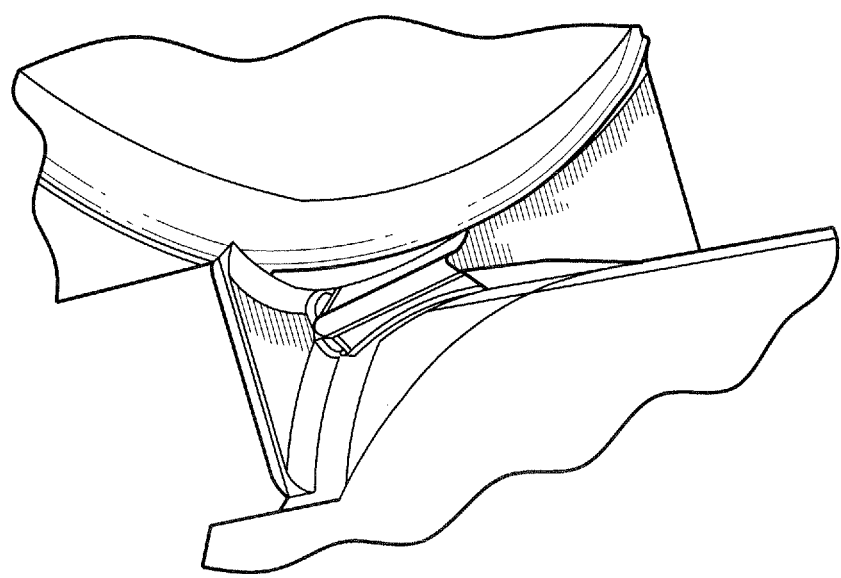
FIG. 7 is a detailed perspective view of the butterfly hinge embodiment of FIG. 6 taken from the top.
Figure 8:
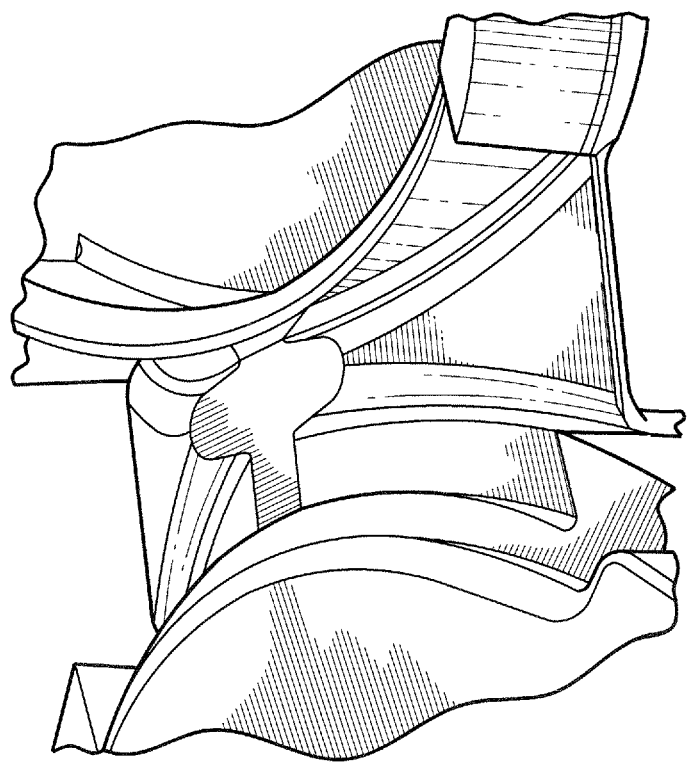
FIG. 8 is an additional detailed perspective view of the butterfly hinge embodiment of FIG. 6 taken from the top.

FIGS. 6, 7, and 8, are top plan detailed views of an embodiment of a butterfly hinge design of a closure.

Figure 9:
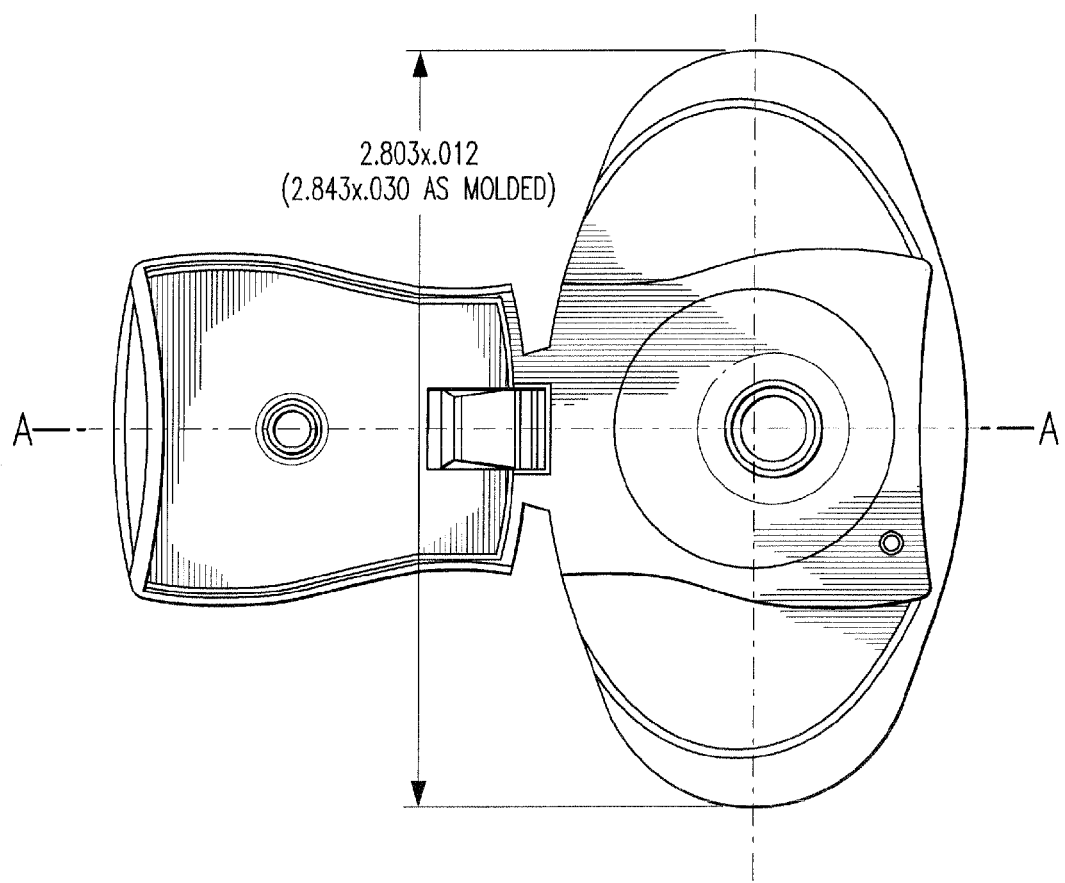
FIG. 9 is a top plan view of an embodiment of a center articulated cam closure with a dual strap living hinge.

FIG. 9 is a top plan view of an embodiment of a center articulated cam closure with a dual strap living hinge.

Figure 10:
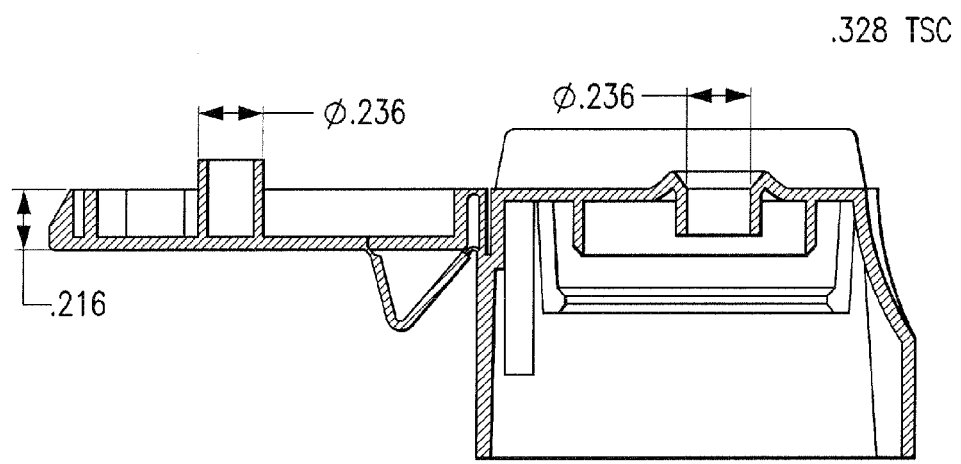
FIG. 10 is a cross-sectional elevational view of FIG. 9 taken along line A-A.

FIG. 10 is a cross-sectional elevational view of FIG. 9 taken along line A-A.

Figure 11:
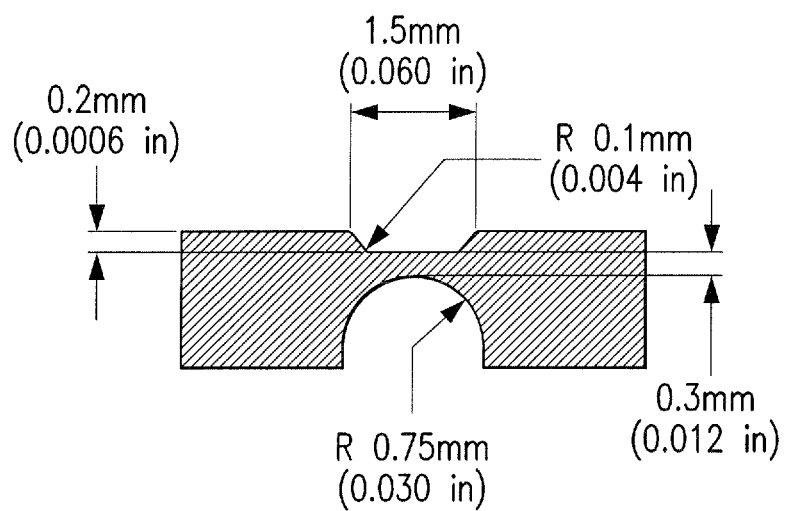
FIG. 11 is a detailed cross-sectional elevational view of an embodiment of an unbiased hinge portion of a closure.

FIG. 11 is a detailed cross-sectional elevational view of an embodiment of an unbiased hinge portion of a closure.

Figure 12:
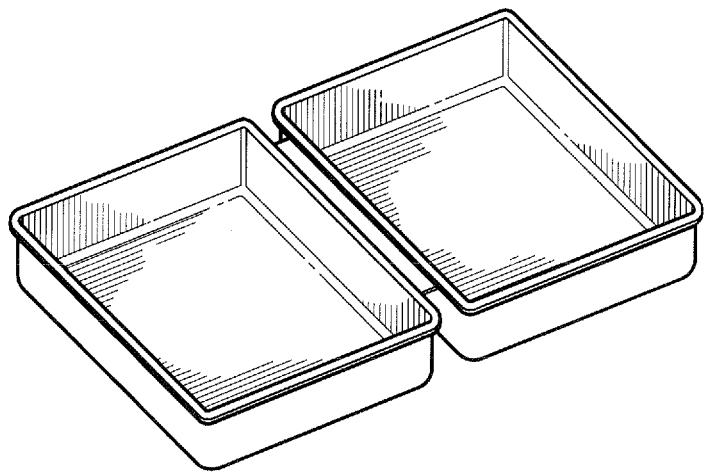
FIG. 12 is a perspective view of an embodiment of a living hinge closure in an open configuration without a bias element.

FIG. 12 is a perspective view of an embodiment of a living hinge closure in an open configuration without a bias element.

Figure 13:
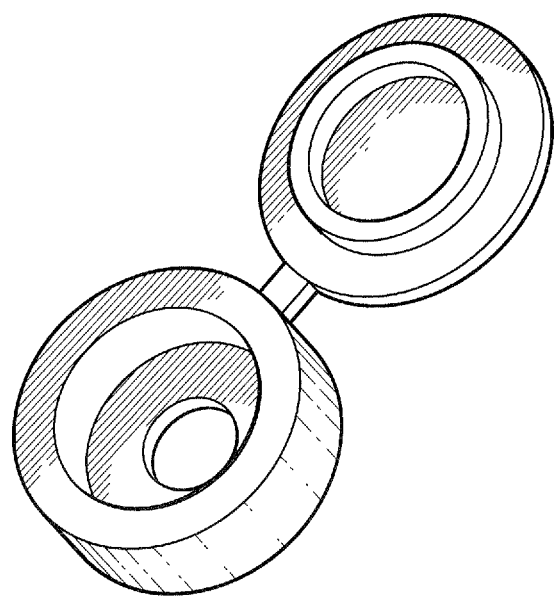
FIG. 13 is a perspective view of another embodiment of a living hinge closure in an open configuration without a bias element.

FIG. 13 is a perspective view of another embodiment of a living hinge closure in an open configuration without a bias element.

Many embodiments of the hinged closure can be formed from the inventive HDPE composition(s) by various molding techniques known in the art such as but not limited to compression molding, injection molding a combination thereof and the like. Such a method for preparing a HDPE containing hinge component includes in a preferred embodiment the steps of:

(a) providing a molding unit having a mold cavity and a mold half having a mold core;
(b) introducing a composition to be molded into a hinge component comprising an at least first HDPE resin into the molding unit;
(c) closing the molding unit;
(d) allowing the introduced composition to be maintained in the molding unit until the termination of a molding cycle; and
(e) opening the molding unit and removing the closure from the mold core.

Another preferred embodiment can be advantageously formed utilizing an injection molding unit having a mold half with a mold cavity and a mold half having a mold core, according to processes known in the art and generally described in Plastic Injection Molding, Volume 1-Manufacturing Process Fundamentals by Douglas M. Bryce. Specifically, in the injection molding process, the molding component is fed into an extruder via a hopper. The extruder conveys, heats, melts, and pressurizes the molding compound to form a molten stream. The molten stream is forced out of the extruder through a nozzle into a relatively cool mold held closed under pressure thereby filling the mold. The melt cools and hardens until fully set-up. The mold then opens and the molded part is removed. The component is molded using barrel temperatures between 160° C. and 300° C., preferably between 190° C. and 260° C. and more preferably between 200° C. and 240° C.

The resulting hinge component has a thickness wherein the minimum thickness of the hinge portion is in the range of about 0.001 to 0.50 inches, preferably about 0.005 to 0.025 inches, and more preferably about 0.01 to 0.014 inches. The hinge component of the invention has a ratio of the minimum thickness of the hinge portion to a maximum thickness of the hinged component that is less than or equal to 0.9, preferably less than or equal to 0.5, and more preferably less than or equal to 0.3.

What is claimed:

1. A composition for manufacturing a molded hinge component, comprising:
   a mixture comprising a first high-density polyethylene (HDPE) and a second HDPE wherein the first HDPE is different from the second HDPE:
   the first high-density polyethylene (HDPE) resin has:
   a. a Melt Index ($I_{2.16}$) of about 0.5 dg/min to 10 dg/min,
   b. a Density of about 0.940 g/cm$^3$ to 0.968 g/cm$^3$, and
   c. a Melt Flow Ratio ($I_{21.6}$:$I_{2.16}$) greater than about 25; and
   the second HDPE resin has a melt flow ratio less than about 30.

2. The composition of claim 1, wherein the first HDPE resin has a melt flow ratio greater than about 50.

3. The composition of claim 2; wherein the second HDPE resin comprises from about 10 to 90% by weight of the composition for manufacturing a molded hinge component.

4. The composition of claim 2, wherein the first HDPE resin is produced via a continuous reaction process either in-situ with one reactor, or in series with multiple reactors.

5. The composition of claim 2, further comprising from about 0.1-80% by weight of any organic, or inorganic filler.

6. The composition of claim 5 wherein the filler is selected from the group consisting of glass spheres, calcium carbonate, post consumer recycle, glass fibers, talc, and combinations thereof.

7. The composition of claim 2, further comprising one or more additives selected from the group consisting of polymer processing aids (ppa), slip components, nucleators, antistatic additives, and organic or inorganic performance enhancing additives or combination thereof.

8. The composition of claim 2, further comprising a HHPA nucleator.

9. The composition of claim 2, further comprising 1,2 Cyclohexanedicarboxylic Acid, or its salts.

10. The composition of claim 2, further comprising a colorant.

11. The composition of claim 2, wherein the overall composition is further characterized by having a viscosity measured at 200/s between about 100-250 Pa-s.

12. The composition of claim 2, wherein the overall composition is further characterized by having a viscosity measured at 8,000/s between about 25-40 Pa-s.

13. The composition of claim 2, wherein the overall composition is further characterized by having an Mz of greater than about 200,000 g/mol.

14. The composition of claim 2, wherein overall composition is further characterized by having an Mw of less than about 65,000 g/mol.

15. The composition of claim 2 wherein the second HDPE is multimodal in terms of molecular weight distribution.

16. The composition of claim 1, wherein the first HDPE resin has a Mz greater than about 200,000.

17. The composition of claim 1, wherein the first HDPE resin comprises from about 10 to 90% by weight of the composition for manufacturing a molded hinge component.

18. The composition of claim 1 wherein the first HDPE is multimodal in terms of molecular weight distribution.

* * * * *